No. 813,882. PATENTED FEB. 27, 1906.
L. GRIFFITH.
ELECTRIC SWITCH AND SIGNAL APPARATUS.
APPLICATION FILED NOV. 5, 1904.
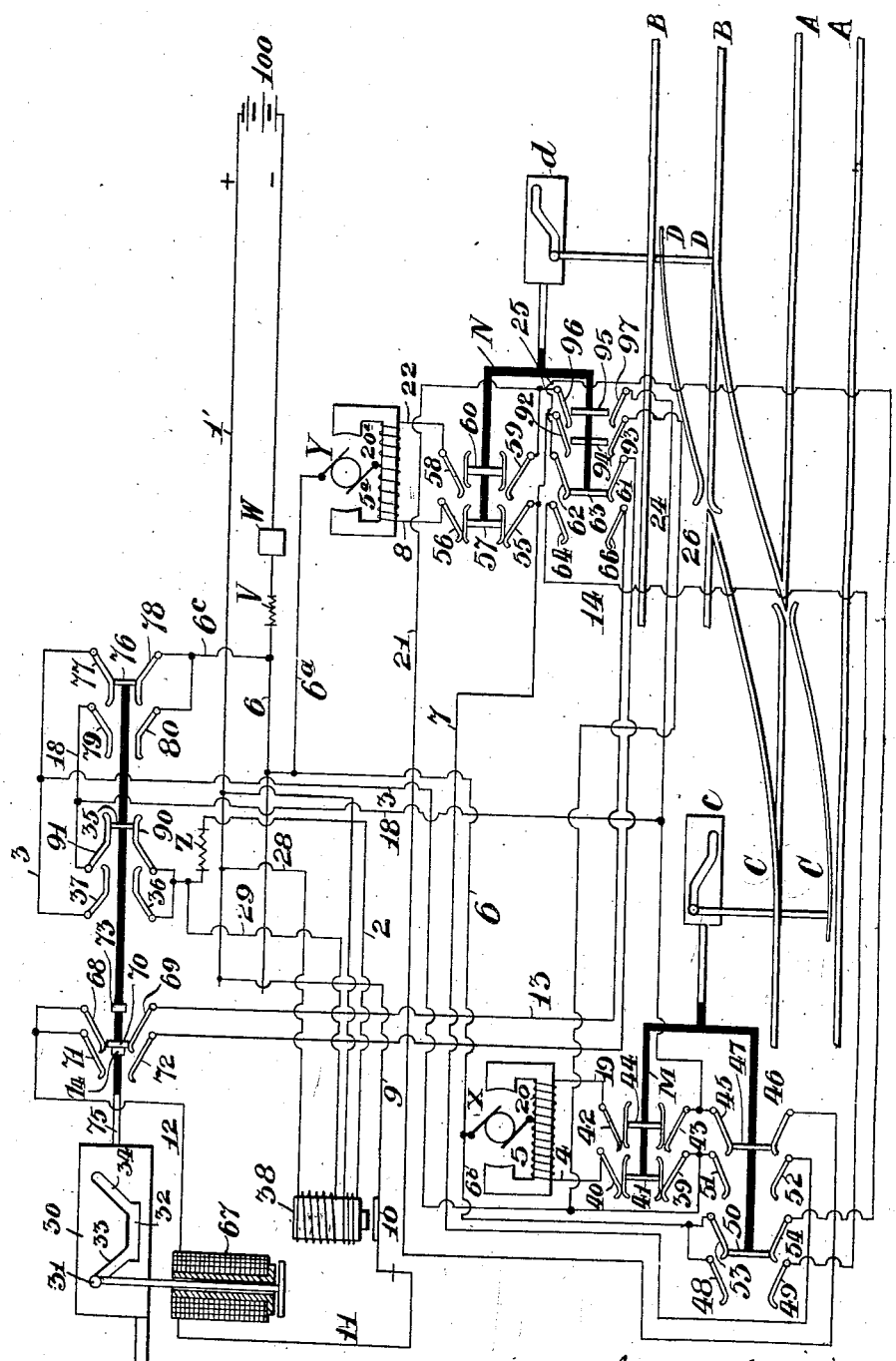

UNITED STATES PATENT OFFICE.

LAWRENCE GRIFFITH, OF YONKERS, NEW YORK.

ELECTRIC SWITCH AND SIGNAL APPARATUS.

No. 813,882.   Specification of Letters Patent.   Patented Feb. 27, 1906.

Application filed November 5, 1904. Serial No. 231,515.

*To all whom it may concern:*

Be it known that I, LAWRENCE GRIFFITH, a citizen of the United States of America, residing in the city of Yonkers, county of Westchester, and State of New York, have invented certain new and useful Improvements in Electric Switch and Signal Apparatus, of which the following is a specification, reference being had to the accompanying drawing.

My invention relates to apparatus for operating railway switches, signals, and the like by means of electricity, and comprises, among other features, a step-by-step movement of two or more such railway-traffic-controlling devices, and means for preventing the action of the indicator when there is current on the circuit of the electric unit which operates the traffic-controlling device.

Reference may be made to United States Letters Patent No. 776,238, granted to me November 29, 1904, and to my pending application, Serial No. 151,578, filed April 8, 1903.

In order that my invention may be clearly understood, I shall first describe in detail the manner in which I carry the same into practice and then point out the novel features of the invention in the claims, reference being had to the accompanying drawing, forming part of the specification.

The drawing is a diagrammatic view of the invention as applied to a crossover or two pairs of switch-points.

A A are the main rails; B B, the siding; C C, the switch-points operatively connected with the main rails A A, and D D the switch-points operatively connected with the siding-rails B B.

$c$ is a motion-plate for operating switch-points C C in the usual manner, and $d$ a motion-plate for operating switch-points D D.

Upon movement of the operator's bar or lever 30 until roller 31 meets the right-hand abutment of horizontal portion 32 of slot 33 32 34, bridge 35 will be moved into contact between contact-springs 36 and 37 and motion-plate $c$ will be moved to operate switch-points C C, as follows: wire 1', relay 38, wire 2, contact-springs 36 and 37, bridge 35, wire 3, contact-springs 39 and 40, bridge 41, wire 4, field 5 of motor X, and therethrough by wire 6 to battery. Motor X being thereby energized, switch or controller M will be moved in correspondence with motion-plate $c$, so as to break connection upon the final movement of the motor between contact-springs 39 and 40, connection having been made between contact-springs 42 and 43 by bridge 44 and connection broken between contact-springs 45 and 46 by bridge 47 and connection made between contact-springs 48 and 49 by bridge 50. At the same time contact will be made by bridge 47 between contact-springs 51 and 52, and contact will have been broken between contact-springs 53 and 54. The switch-points C C and motion-plate $c$ having been moved to their fullest extent, motor X has been cut out of circuit by bridge 41 moving from between contact-springs 40 and 39, and the energy from the battery or other source of electric energy 100 now energizes motor Y as follows: Wire 1', relay 38, wire 2, contact-springs 36 and 37, bridge 35, wire 3, contact-springs 51 and 52, bridge 47, wire 7, contact-springs 55 and 56, bridge 57, wire 8, field $5^a$ of motor Y, and thus by wire $6^a$ to battery, so that motor Y will be energized to move motion-plate $d$, with its switch-points D D, and with it switch or controller N, so as to break connection between contact-springs 55 and 56 and make connection between contact-springs 58 and 59 by bridge 60 and at the same time break connection between contact-springs 61 and 62 by bridge 63 and make connection between contact-springs 64 and 66 by said bridge 63. Energy from the source 100 will now energize solenoid or electric unit 67 as follows: wires 1' 9 10 11, solenoid 67, wire 12, contact-springs 68 and 69, bridge 70, wire 13, contact-springs 66 and 64, bridge 63, wire 14, contact-springs 48 and 49, bridge 50, wires $6^b$ and 6, to battery. Solenoid 67 being thus energized, its armature will operate roller 31 in inclined portion 34 of slot 33 32 34, and thereby break connection between contact-springs 68 and 69 by bridge 70 and make connection by said bridge 70 between contact-springs 71 and 72. It will of course be understood that stops 73 and 74 operate to move said bridge 70 during a portion only of the stroke of rod 75, which rod 75 is attached to bar 30 and moves with it, carrying also bridge 35 and bridge 76, whose functions with contact-springs 77 and 78 and 79 and 80 will be hereinafter described. Said relay 38 when energized as above described is adapted to break electrical connection of the solenoid 67 by breaking connection between wires 10 and 11. Said relay 38 is provided with windings connected both with wires 1 and 2 and with windings connected with wires 28 and 29, such windings being in parallel with each other and in series with one or the other of the motors. It will be understood that the winding connected with wires 28 and 29 normally aid the winding connected with wires 1 and 2. Said relay 38 is therefore energized whenever current is on the circuit of either of said motors X or Y. The winding of the relay 38, connected with the wires 28 and 29, is of higher resistance than that connected with the wires 1 and 2, and therefore should an abnormally large current be sent through the circuit containing the lower windings sufficient to cause the blowing out of fuse Z the relay 38 would still act, being energized by the windings connected with wires 28 and 29 to hold open the circuit of solenoid 67 by breaking connection between wires 10 and 11. Should there be a cross or accidental current on the circuit of motor X when the apparatus is in the position shown in the drawing, the same will be shunted away from said motor back to battery as follows: wire 3, contact-springs 77 and 78, bridge 76, and wire 6ᶜ. Should the switch-points C C, and therefore motion-plate c, be moved while the apparatus is in the position shown in Fig. 1, connection will be immediately made between contact-springs 42 and 43 by bridge 44 and motor X energized to replace said switch-points and motion-plate as follows: wire 1′, relay 38, wire 2, contact-springs 90 and 91, bridge 35, wire 18, contact-springs 42 and 43, bridge 44, wire 19, field 20 of motor X and therethrough and by wire 6 to battery. Should there be a cross or accidental current on the circuit of motor Y while the apparatus is in the position shown in Fig. 1, the same will return to battery before motion-plate d moves to operate switch-points D D as follows: wire 7, contact-springs 92 and 93, bridge 94, wires 26 and 3, contact-springs 77 and 78, bridge 76, and wire 6ᶜ. Should switch-points D D, and therefore motion-plate d, be moved while the apparatus is in the position shown in Fig. 1, connection will be immediately made between contact-springs 96 and 97 by bridge 95 and the motor Y energized to replace said switch-points D D and motion-plate d as follows: wire 1′, relay 38, wire 2, contact-springs 90 and 91, bridge 35, wires 18 and 24, contact-springs 97 and 96, bridge 95, wire 25, contact-springs 59 and 58, bridge 60, wire 22, field 20ᵃ of motor Y, and therethrough and by wire 6ᵃ to ground or battery. In going from reverse position to normal like circuits are made and the same results accomplished, it being understood that on the reverse movement and position contact-springs 71 and 72 are the counterparts of contact-springs 68 and 69, contact-springs 37 and 36 the counterparts of contact-springs 91 and 90, contact-springs 79 and 80 the counterparts of contact-springs 77 and 78, and so on.

V is a fuse, and W a cut-out box for breaking the circuit in the usual way.

Should the circuit of solenoid 38 be accidentally returned to battery while the apparatus is in the position shown in the drawing, connection being made between contact-springs 68 and 69 by bridge 70, said solenoid 38 will be energized and the apparatus will be held against movement by the operator by the pushing up of roller 31 in slot 33.

Of course I do not limit myself to either a series or a parallel electrical connection nor to a return to battery by metallic circuit as distinguished from grounding.

What I claim, and desire to secure by Letters Patent, is—

1. In electric apparatus for operating switches, signals, and the like comprising an electric indicator and a plurality of electrically-operated motion-plates or devices to be moved, means for preventing the action of the indicator while there is electric energy supplied to the operative means of any of said motion-plates.

2. In electric apparatus for operating switches, signals and the like having a plurality of electrically-operated motion-plates or devices to be moved, means for shunting current away from one or more of the operative means of said motion-plates when the apparatus is at normal or reverse positions.

3. In electric apparatus for operating switches, signals and the like having a plurality of electrically-operated motion-plates or devices to be moved, the combination of an electric indicator, means for shunting current away from one or more of the operative means of said motion-plates, with means for preventing the action of the indicator while there is electric energy supplied to any of the operative means of said motion-plates.

4. In electric apparatus for operating switches, signals and the like having a plurality of electrically-governed motion-plates or devices to be moved, means for shunting current away from one or more of the governing devices of said motion-plates when the apparatus is at normal or reverse position.

5. In electric apparatus for operating switches, signals, and the like, comprising an electric indicator and a motion-plate or device to be moved electrically operated in two directions, electric means separate from the indicator for preventing the action of the indicator while there is electric energy supplied to the operative means of said motion-plate.

6. In electric apparatus for operating switches, signals, and the like, comprising an electric indicator and a motion-plate or device to be moved electrically operated in two directions, means for preventing the action of the indicator while there is electric energy supplied to the operative means of said motion-plate, which consists of a relay adapted to break the electric connection of said indicator at said time.

7. In electric apparatus for operating switches, signals, and the like, having a motion-plate or device to be moved electrically operated in two directions, means for shunting current away from the operative means of said motion-plate when the apparatus is at normal or reverse position.

8. In electric apparatus for operating switches, signals, and the like, having an electrically-operated motion-plate or device to be moved, the combination of an electric indicator, means for shunting current away from the operative means of said motion-plate, with means for preventing action of the indicator while there is electric energy supplied to the operative means of said motion-plate.

9. In electric apparatus for operating switches, signals, and the like, having an electrically-operated motion-plate or device to be moved, the combination of an operator's switch for said apparatus having contacts for shunting current on the circuit of the operative means of said motion-plate when the apparatus is at normal or reverse position back to battery, with a fuse or cut-out device in said operative circuit.

In testimony whereof I have hereunto set my hand this 4th day of November, 1904.

LAW. GRIFFITH.

In presence of—
 FRANCIS L. FIELD,
 J. F. BOUDREAU.